United States Patent [19]

Hendrix

[11] 4,367,078
[45] Jan. 4, 1983

[54] LIQUID DEGASSER WITH SELF-CLEARING EXHAUST ORIFICE

[75] Inventor: Eugene R. Hendrix, Pittsfield, Mass.

[73] Assignee: General Electric Company, Schenectady, N.Y.

[21] Appl. No.: 273,610

[22] Filed: Jun. 15, 1981

[51] Int. Cl.³ .......................... B01A 45/12; B04C 3/00
[52] U.S. Cl. ........................................ 55/184; 55/185; 55/204; 55/404
[58] Field of Search .................................. 55/185–188, 55/184, 191, 201, 203, 404, 405

[56] References Cited

U.S. PATENT DOCUMENTS

| Re. 27,882 | 1/1974 | Burnham, Sr. | 55/41 |
| 928,546 | 7/1909 | Schneible | 55/184 |
| 1,982,733 | 12/1934 | Forster | 55/405 |
| 2,955,916 | 10/1960 | Guyer et al. | |
| 3,447,290 | 6/1969 | Flory | 55/404 X |
| 3,828,524 | 8/1974 | Booth et al. | 55/43 |
| 3,877,904 | 4/1975 | Lowrie | 55/392 |
| 4,097,358 | 6/1978 | Wiseman | 204/270 |
| 4,108,778 | 8/1978 | Lambert et al. | 55/405 X |
| 4,160,716 | 7/1979 | Wiseman | 204/270 |
| 4,272,258 | 6/1981 | Shifflett | 55/203 |

Primary Examiner—John Adee
Attorney, Agent, or Firm—Francis K. Richwine

[57] ABSTRACT

A centrifugal (cyclone) separator for extracting entrained gas from a liquid. The axially aligned gas exhaust orifice at the end of the separator is protected by a screen or filter which intercepts and filters out incidental debris. The structure carrying the screen is mounted for rotation about the separator axis and carries vanes which extend into the swirling liquid to rotate the screen responsive to liquid flow to clear the screen with a centrifugal action.

2 Claims, 3 Drawing Figures

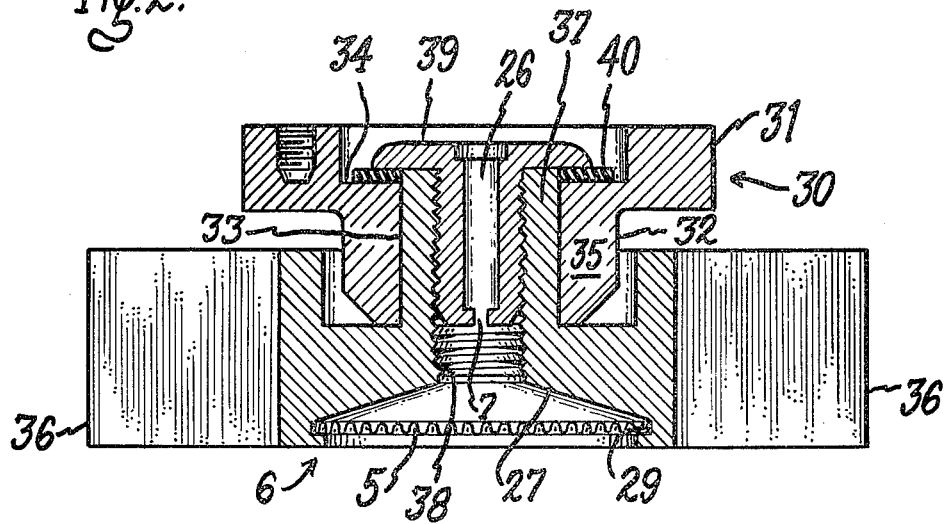
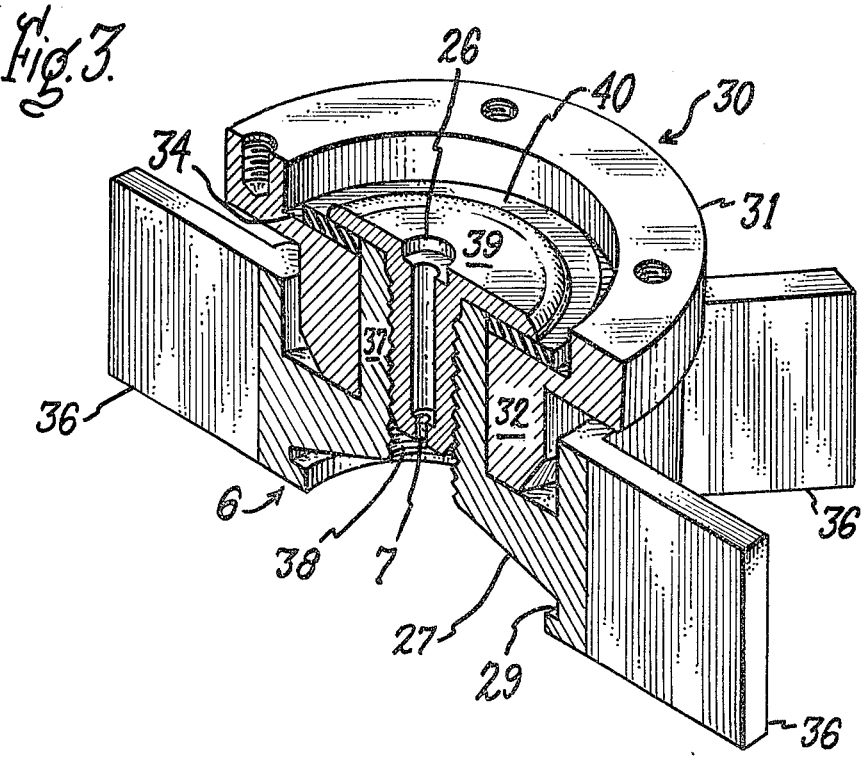

LIQUID DEGASSER WITH SELF-CLEARING EXHAUST ORIFICE

The United States Government has rights in this invention pursuant to Contract No. N00140-77-C-6572 awarded by the Department of the Navy.

BACKGROUND OF THE INVENTION

1. Field of the Invention

This invention pertains to the removal of gas from a liquid in which it has become entrained and particularly those applications in which a small quantity of gas must be removed from a liquid where it would be beneficial to have no gas present. Examples of application of this system are hydraulic systems and electrolyte management systems, systems in which a small quantity of gas can have highly undesirable effects.

2. Background Art

Cyclone or centrifugal separators have been used in many applications to separate one substance from another on the basis of density, whether or not those substances are of the same or different physical states and particularly for the separation of light liquids from heavy liquids and gases from liquids. Several devices in the prior art can be described as being cylindrical or conical in shape about a vertical axis having a port near the top of the structure for introduction, tangentially of the interior surface of the structure, of a liquid bearing an entrained gas and having two exit ports, one centrally located at the top of the structure for escaping gas and the other at the bottom for the exit of the degassed liquid. Schneible, U.S. Pat. No. 928,546, July 20, 1909, and Wiseman, U.S. Pat. No. 4,097,358, June 27, 1978, are examples of such basic configuration.

In some applications, baffle and other structures have been used in attempts to preclude small amounts of a liquid from being entrained in gas which is removed from the mixture. Examples of such structures are found in the baffle and collector ring of Guyer et al, U.S. Pat. No. 2,955,916, Oct. 11, 1960, and in the baffle plate of Lowrie, U.S. 3,877,904, Apr. 15, 1975. In still other applications, particularly those which are directed to the separation of a liquid aerosol from a gas stream, a filter has been used to collect, liquefy and discharge the aerosol as a liquid. An example of this type of structure using a rotating conical lyophobic filter, in addition to a deflector or baffle, is found in Booth et al, U.S. Pat. No. 3,828,524, Aug. 13, 1974.

SUMMARY OF THE INVENTION

This invention provides a specific structure for the removal of an entrained gas from a liquid where the quantity of gas is either small or variable or both as, for example, the removal of free hydrogen from an electrolyte in an electrolyte management system for a primary electrochemical system as, for example, a seawater battery. The structure constitutes a cyclone separator which can be either cylindrical or conical or a combination of the two shapes having a tangentially directed input port at one end of the structure for receiving a mixture of the materials to be separated and a discharge port at or near the opposite end of the separator for the discharge of the denser material, i.e., the liquid in the case of separation of gaseous material from a liquid. The structure also includes a gas discharge orifice at the inlet end of the structure and a novel filter structure located between the body of the separator and the gas orifice.

The filter structure includes a body containing a gas passage communicating from the interior of the separator to the gas orifice and a rotatable portion containing a filter located in the entrance to the gas conduit to prevent solid particles entrained in the escaping flow from clogging the gas orifice. Liquid droplets passing the filter screen are prevented from choking the orifice by centrifugal force resulting from rotation of the rotatable portion containing the filter. The rotatable filter body is rotated about its axis by vanes or fins which extend into the flow of the mixture as it enters the separator tangentially to the interior wall.

BRIEF DESCRIPTION OF DRAWINGS

FIG. 2 is a vertical section of the filter structure of the invention.

FIG. 3 is a perspective of the cutaway filter structure shown in FIG. 2.

DETAILED DESCRIPTION

Figure 1:
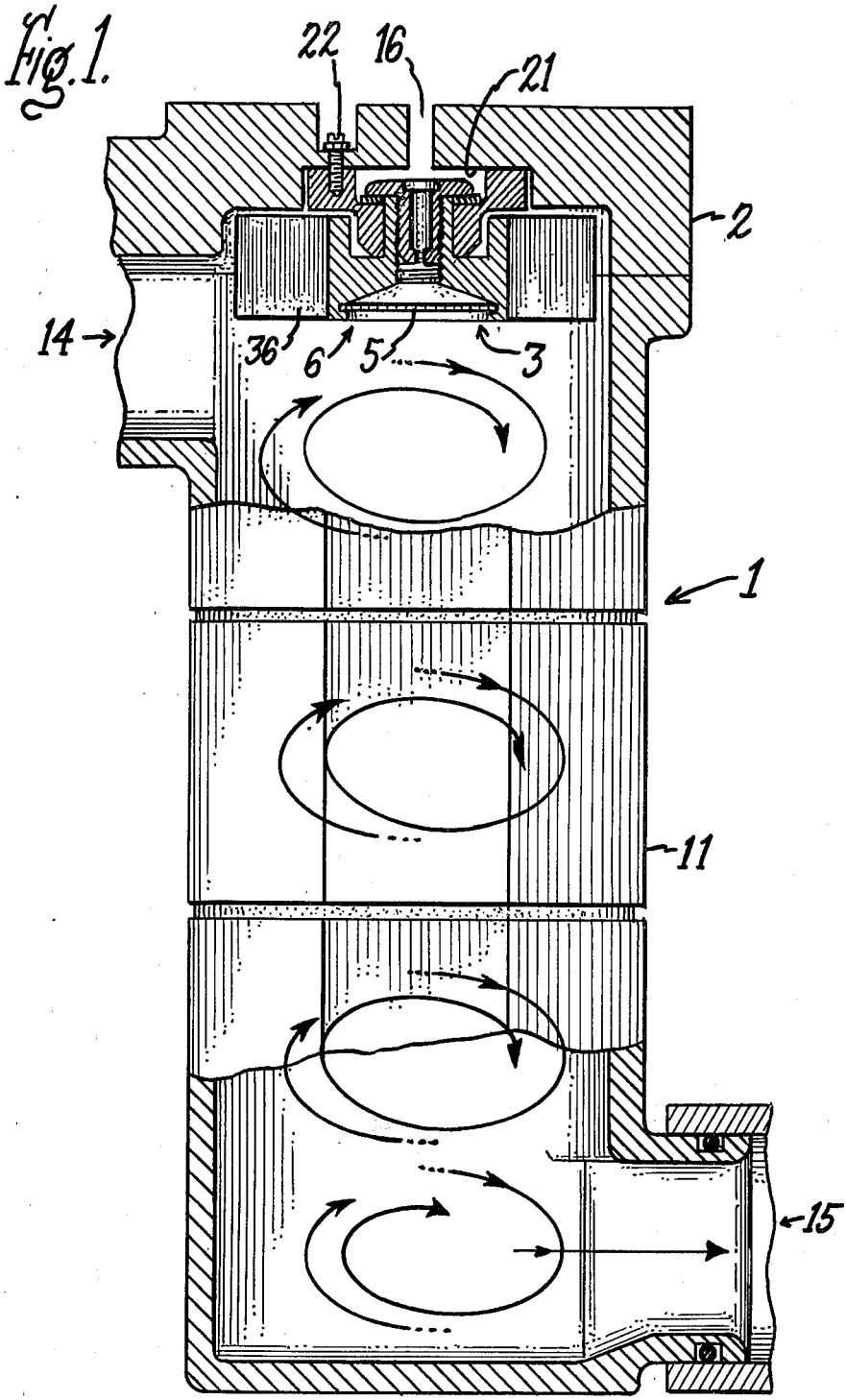
FIG. 1 is an elevation, partially in section, of a cyclone separator according to the invention.

Many systems using or dependent on fluids encounter contamination problems which can be detrimental or even dangerous in system operation, particularly where different physical states of substances are involved as, for example, the presence of air in a hydraulic system, an explosive gas in an electrolyte system or condensation of water in a pressurized air system which require removal of the contaminating substance. As noted with respect to the prior art, cyclone separators have been used to separate liquids and gases in both liquid and gas systems. The present invention is directed toward an improved cyclone separator for the removal of an entrained gas from a liquid management system in which some solid particles may be present and has specific utility in those applications in which the quantity of entrained gas is variable and the gas exhaust is controlled by a small limiting orifice. In particular, this invention is directed to the removal of hydrogen gas from an electrolyte in which small particles are entrained and from which gas flow is limited by a small orifice.

In FIG. 1, the invention is embodied in a cyclone separator 1 having a body portion 11 and a top portion 2. The body portion 11, which can be cylindrical as shown in FIG. 1 or conical or a combination of the two shapes, includes an inlet port 14 for directing the mixture to be treated tangentially of the interior wall so as to cause the mixture to swirl under the influence of the inlet flow around the wall of the body to the opposite end of the separator where the liquid will flow from the separator through an outlet conduit 15. During this transition under the influence of the imposed centrifugal forces which create a vortex and a radial pressure gradient, any gas entrained in the liquid will migrate toward the center of the separator and, under the influence of a pressure gradient, through the filter screen 5 and the limiting orifice 7 to the ambient environment through the passage 16. The passage 16 may be provided with a large diameter pipe or hose connection to permit movement of the escaping gas to a particular location.

Although the FIGURES show the exemplary device upright about a vertical axis, that orientation is neither necessary nor limiting on the invention or the implementation with the notation that separators of this type are most often used in systems having pressures and flow rates which minimize the effect of gravity. The system from which the present invention resulted produced forces in the range of 150g.

In systems in which there might be only a small quantity of contaminating gas in the mixture, as can occur in electrolyte systems, the structure and configuration of a gas discharge orifice such as 7 is critical in that too large an orifice will allow excessive liquid to flow from it and too small an orifice may be subject to clogging when liquid or solid particles choke or clog the orifice. For this reason, the separator structure forming the subject matter of this invention includes a filter structure 3 to prevent solid particles from clogging the orifice 7. The filter structure 3 which is recessed and held into the specifically configured end portion 2 is, as shown in more detail in FIGS. 2 and 3, made up of several components.

In the embodiment illustrated, there is a cylindrical fixed bearing member 30 having an annular mounting flange portion 31 which is mounted into recess 21 of the end portion 2 of the separator and held in place by fasteners such as the screws 22. The fixed bearing member 30 also has a cylindrical bearing portion 32 having an interior cylindrical bearing surface 33 extending from a recessed portion 34 on one side of member 30 to an end of the bearing portion 32. A rotating member 6 is supported in fixed bearing member 30 for rotational movement with respect thereto about the separator axis by means of a cylindrical stub shaft 37 journaled into bearing surface 33 of cylindrical bearing portion 32. Cylindrical shaft 37 has a threaded axial bore 38 for the purpose of receiving the screw portion of headed retaining member 39 which retains the rotating member 6 on the cylindrical bearing portion 32 of fixed bearing member 30. Freedom of movement about the axis of the filter structures is maintained by the bearing surfaces at 33 and ring 40 which provides a bearing surface for the overhanging portion of the head of retaining member 39. The retaining member 39 is provided with a bore 26 to permit the passage of escaping gas from the discharge orifice 7 of the separator to the outlet port 16. The threaded axial bore in the rotating member at the interior end thereof is enlarged as, for example, by the conical cut at 27, to provide a relatively large area gas inlet and a self-clearing portion of conduit, the edge of which is undercut to form the groove 29. A screen or filter 5 is placed across the gas inlet and may be held in place by its own resiliency or by a circumferential snap ring.

The body of rotating member 6 carries a plurality of fins or vanes 36 projecting from the member which are sized so as to extend a distance into the path of the mixture flowing into separator body 11 through the inlet port 14 so as to be driven by the flow. The whole filter structure 3 may be recessed into the top portion 2 as illustrated in FIG. 1 or mounted flush with the interior of the end or be partially recessed with only the annular mounting flange portion of the fixed bearing member set into the top portion depending on the vane exposure needed to impart spin to member 6. Although this description with the accompanying illustrations constitutes a preferred embodiment in the sense that it depicts the best implementation of the invention that has been built and tested, it is not a particularly unique application of the concept that should limit the scope of the invention. Other equivalent bearing structure and retaining systems can be used as long as there is a combination of a fixed bearing member, a rotating member which is axially aligned with the separator body and is driven by vanes which project into the fluid flow, an exhaust path for escaping gas, and a rotating filter or screen to protect the exhaust orifice from solid particles, and rotation of the members from the screen to the orifice for causing liquid to migrate to the exterior of the screen by centrifugal force and thereby be removed from the gas orifice entrance.

We claim:

1. A centrifugal separator for removing entrained gas from a liquid including a body which is symmetrical about an axis, an inlet port for introduction of liquid tangentially to the wall of the body proximate one end thereof to cause a spin induced vortex about said axis, an exit port remote from said one end for discharge of degassed liquid, a gas exhaust orifice in the body at said one end, and a filtering device at said orifice, wherein:

said filtering device is interposed between said orifice and said vortex and comprises a vaned spin member mounted for rotation about said axis responsive to liquid flow in said body;

said vaned spin member is attached to said body, is supported for rotation about said axis by a bearing structure and has radial vanes extending into the flow path of liquid about said vortex;

said spin member includes a gas inlet centered on said spin axis, a gas conduit to convey gas from said gas inlet to said orifice and means for retaining a filter in said gas inlet;

said gas conduit includes a conical portion wherein the base of said conical portion constitutes said gas inlet and lies in a plane normal to said axis and the apex of said conical portion communicates with said orifice; and a planar filter is secured in said gas inlet by said means for retaining to interdict all fluid flow from said vortex to said orifice;

whereby liquid flowing through said separator to be centrifugally degassed will rotate said vaned spin member to cause said planar filter to spin off liquid entrained in gas enroute to said orifice; and whereby aerosol passing the filter and collecting in the gas conduit will be centrifuged back to the gas inlet rather than being allowed to choke off the orifice.

2. In a centrifugal separator for removing entrained gas from a liquid including a body which is symmetrical about an axis, an inlet port at one end of said body for introduction of liquid tangentially to the wall of the body to cause a spin induced vortex about the axis, an exit port at the other end of said body for discharge of degassed liquid, and a flow limiting gas exhaust orifice also at said one end of the body, the improvement comprising:

a filter device mounted proximate said orifice for filtering gas released from said liquid to remove solid particles and liquid therefrom to avoid choking said exhaust orifice as the gas flows from the vortex, said device including:

a spin member, bearing means supporting said spin member for rotation about said axis, a gas conduit through said spin member axially thereof having a mouth into which gas accumulating in said vortex will flow, said conduit being flared conically from said orifice to form said mouth which is symmetrical about said axis, means in said mouth for receiving and holding a planar filter for filtering all gas entering such mouth to remove solid debris and liquid droplets, and vanes protruding from the main portion of said spin member radially of said axis into the path of said liquid flowing about said vortex for driving said spin member responsive to liquid flowing through said body;

whereby spin imparted to said spin member and by flow of said liquid about said vortex will cause a filter in said conduit mouth to be cleared of solids and liquid droplets by centrifugal force and will cause liquid aerosol collecting in said conically flared conduit to flow out of said mouth.

* * * * *